(No Model.)
H. A. FREEMAN.
SULKY PLOW.
No. 355,445. Patented Jan. 4, 1887.
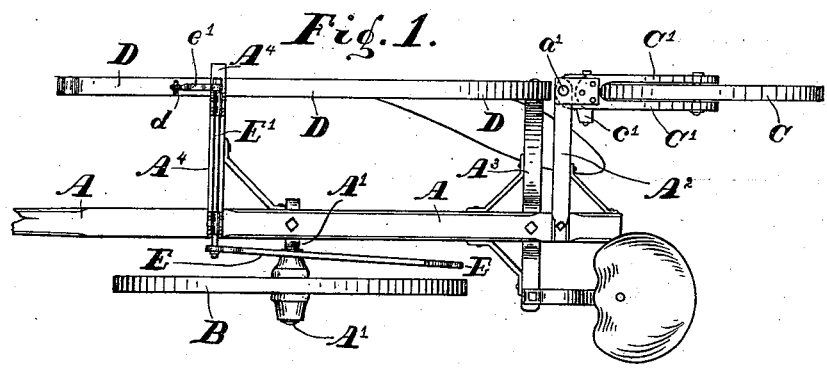
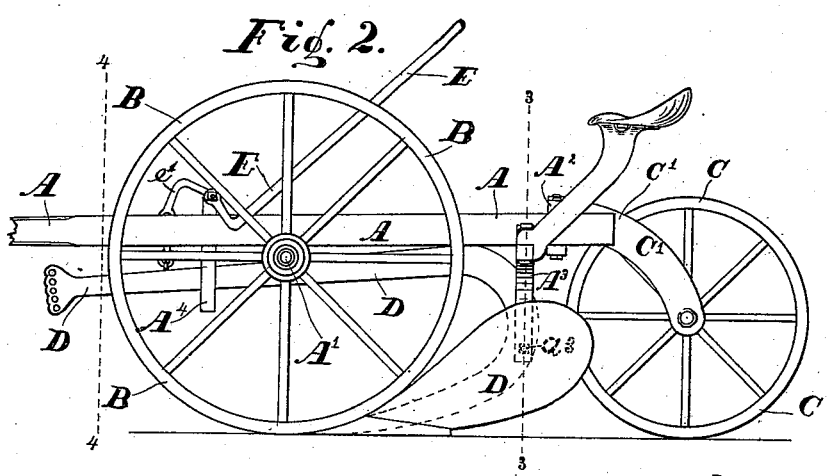
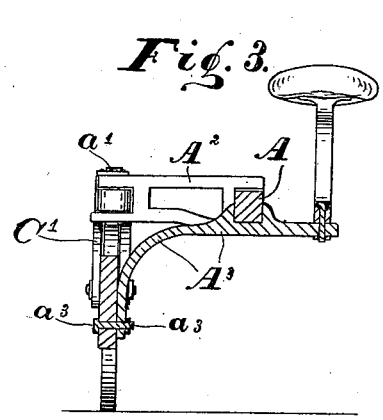
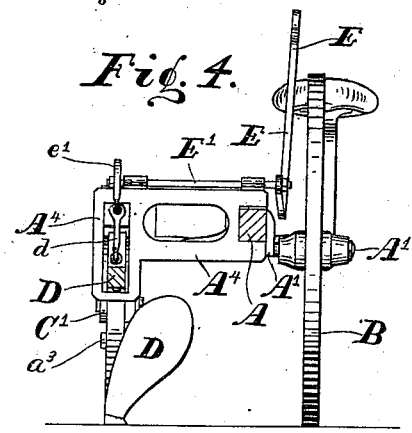
WITNESSES.
Chas. A. Duffrins.
M. R. Templeton.
INVENTOR.
Henry A. Freeman,
PER
C. Bradford,
ATTORNEY.

UNITED STATES PATENT OFFICE.

HENRY A. FREEMAN, OF WESLEY, INDIANA.

SULKY-PLOW.

SPECIFICATION forming part of Letters Patent No. 355,445, dated January 4, 1887.

Application filed May 13, 1886. Serial No. 202,044. (No model.)

*To all whom it may concern:*

Be it known that I, HENRY A. FREEMAN, of the town of Wesley, county of Montgomery, and State of Indiana, have invented certain new and useful Improvements in Sulky-Plows, of which the following is a specification.

My said invention principally consists in so arranging the wheels that one will travel in the furrow last plowed, while the other travels behind the plow in the furrow which is at the time being plowed, whereby a smooth track for the plow is always provided in the even ground which forms the bottom of the furrows, and the usual jostling which is present when the wheels of the plow travel over the surface of the ground is avoided.

It further consists in certain details of construction, as will be hereinafter more particularly described and claimed.

Referring to the accompanying drawings, which are made a part hereof, and on which similar letters of reference indicate similar parts, Figure 1 is a top or plan view of a plow embodying my said invention; Fig. 2, a side elevation of the same; Fig. 3, a transverse vertical sectional view, looking toward the right from the dotted line 3 3; and Fig. 4, a similar view as seen from the dotted line 4 4.

In said drawings, the portions marked A represent the main beam of the frame, which also extends forward and forms the tongue, B the wheel which travels in the furrow last plowed, C the wheel which travels in the furrow at the time being plowed, D the plow, (including its beam,) and E a lever by which the front end of the plow-beam may be raised or lowered.

The main beam A carries a frame portion, A', carrying a spindle on which the wheel B is mounted, a frame portion, A², to which the housing of the wheel C is connected, a frame portion, A³, to which the rear portion of the plow is pivoted, and upon the other end of which a seat is preferably mounted, and a frame portion, A⁴, through which the forward end of the plow-beam passes, and by which it is held in position.

The wheel B is any ordinary wheel, and is mounted upon its frame portion or spindle A' in the ordinary manner. It is arranged at such a distance from the plow as to travel in the furrow preceding the one which is at the time being turned.

The wheel C is mounted in the housing C', which is in turn pivoted to the frame portion A², and is arranged to travel directly behind the plow in the furrow which is at the time being turned. The housing C' is so secured to the frame portion A² by a pivot, a', that it may turn thereon, and thus when the plow is being turned around this wheel can always adjust itself to the direction the plow is moving in. This housing has a stop, c', on the side nearest the main beam A, which prevents it from swinging toward said main beam, it not being desirable to have this wheel swing much, if any, inside the line in which the plow is moving.

The plow D is secured to the frame portion A³ by a pivot, a³, at its rear end, and its front end or beam passes through a slot in the frame portion A⁴. The frame portion A³ being rigid, it is thus always held at the proper distance from the level of the main beam A, while it is permitted to be moved on its pivot so as to run as desired in the ground.

The lever E is connected to the rock-shaft E', which is mounted in bearings on the frame portion A⁴, and this rock-shaft has a projecting-arm, e', which is connected by a link, d, to the forward portion of the beam of the plow D. This lever extends back to a position convenient to the seat, where it may be easily operated by the driver.

Having thus fully described my said invention, what I claim as new, and desire to secure by Letters Patent, is—

1. The combination, in a sulky-plow, of the frame consisting of the main beam A and the projecting frame portions A', A², A³, and A⁴, the wheel B, mounted on the portion A', the wheel C, having housing C', said housing being pivoted to the frame portion A², and the plow D, pivoted to the frame portion A³, and its beam extending through a slot in the frame portion A⁴, substantially as shown and described.

2. In a sulky-plow, the combination of the main part A of the frame extending out and forming the tongue of the plow, the wheels mounted on projecting parts A' and A², secured to said main part A, a part, A³, secured to said main part and extending out and down to between the sides of the plow, and said plow secured to the lower end of said part $A^3$ and extending forward through the part $A^4$, and said part $A^4$, substantially as set forth.

3. The combination, in a sulky-plow, of the frame consisting of the main beam A and projecting portions $A'$ $A^2$ $A^3$ $A^4$, secured thereto and extending out therefrom, having the other parts of the plow mounted thereon, the wheel B, and plow D, each mounted on one of said projecting portions, the projecting portion $A^2$, extending out to a point behind the plow, the housing $C'$, pivoted and adapted to swing freely on the end of said part $A^2$, and the wheel C, mounted in said housing, all substantially as set forth.

In witness whereof I have hereunto set my hand and seal, at Indianapolis, Indiana, this 4th day of May, A. D. 1886.

HENRY A. FREEMAN. [L. S.]

In presence of—
    C. BRADFORD,
    CHARLES L. THURBER.